Dec. 25, 1962  S. F. CHAPPELL  3,070,266
DISPENSER HAVING A FLOAT AND GRAVITY CONTROLLED CLOSURE
Filed March 29, 1960

INVENTOR.
Story F. Chappell
BY
Curtis, Morris, & Safford
ATTORNEYS

3,070,266
DISPENSER HAVING A FLOAT AND GRAVITY CONTROLLED CLOSURE
Story F. Chappell, 9 Knoll St., Riverside, Conn.
Filed Mar. 29, 1960, Ser. No. 18,306
9 Claims. (Cl. 222—464)

This invention relates to dispensers and in particular to dispensers which are suitable for use with a container of thick or viscous liquid, such as a detergent, soap, and shampoo.

Liquid detergents, soaps, and shampoos are now packaged in containers which may readily be used with dispensers which provide a consistent (within tolerances acceptable to the trade) measured dose. However, as far as it is known, no adequate dispenser is available which will meet the needs of these thick heavy liquids. The only known automatic dispensing devices for these containers are those which are primarily intended for use with thin watery type liquids such as liquors and hair tonic.

In order to use most liquid detergents properly and economically, it is necessary that only a definite and measured amount of detergent be used in making each quantity of solution. Heretofore, the standard means of measuring the correct amount of liquid detergent has been to fill the closure cap of the container with detergent so that the cap serves as a measuring cup. Such a measuring operation is cumbersome and messy as well as being a nuisance to the user.

Some dispensers designed for use with thin and watery types of liquids have delicate moving parts which are quickly clogged by thick, heavy, viscous liquids such as detergents; still others have moving parts that remain exposed to the air between uses. Such dispensers with easily clogged or air-exposed moving parts become tightly sealed, and the moving parts "frozen," by a dried or caked film of detergent when the dispenser is left unused for any extended period of time, which is often the case.

Dispensers designed for use primarily with thin and watery liquids are also fairly intricate and expensive to manufacture and are not usually designed for insertion into containers as part of an automatic factory loading operation.

Accordingly, it is an object of the present invention to provide an automatic, self-operating dispenser particularly adapted for but not restricted to use with thick, viscous liquids such as detergents, shampoos, soaps, etc. It is another object to provide a dispenser which is of simple construction and inexpensive to manufacture. It is a further object to provide a dispenser which can either be inserted by hand by the consumer or be adapted for installation into a container, can or bottle during a factory container filling operation using automatic machinery.

It is still another object of the present invention to provide a dispenser wherein the moving parts of the dispenser are at all times maintained in or adjacent to a leakproof bath of the liquid to be dispensed, the leakproof condition of the vessel holding the liquid bath not dependent on a valve closure subject to slow leakage between uses. It is also a further object to provide a dispenser which allows the user to pick up and pour from the container in any position, to give a quick, acceptably consistent measured dose, with the flow of liquid being cut off as soon as the measured amount is delivered.

In the accompanying drawings, preferred embodiments of the present invention are shown and these embodiments are described in detail in the specification. However, it is to be understood that the drawings and description are not intended to be either exhaustive or limiting of the present invention in improved dispensers, but on the contrary, are for the purpose of illustrating and describing the invention in order that others skilled in the art may fully understand the invention, its principles and the application thereof and that they may embody it and adapt it in numerous forms, each as may be best suited to the requirements of a particular dispenser and its intended usage.

Figure 1:
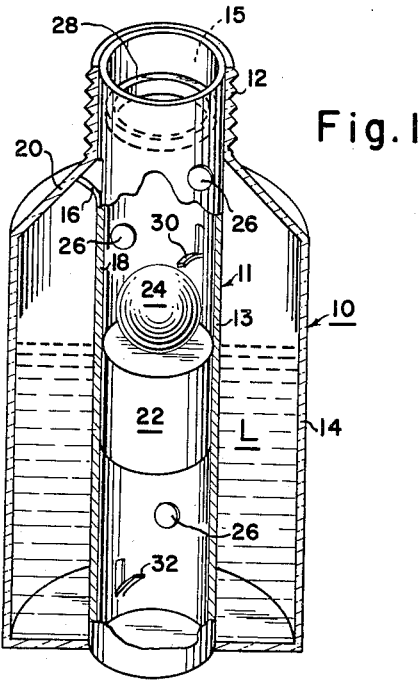
FIGURE 1 is a partially fragmentary perspective view of a dispenser for measuring liquids, the dispenser being inserted into a container.

Referring to the drawings and to FIGURE 1 in particular a container 10 fitted with a measured dosage dispenser 11 is shown. The container 10 may be of any suitable material and construction such as the well known plastic, metal or glass containers for holding such viscous solutions as liquid detergents.

The container 10 has a neck portion 12 which extends from a large body portion 14. The dispenser 11 includes a cylindrical shell 13 which is placed in the container 10 by being inserted through an opening 15 in the neck 12. After the dispenser 11 is in place, if desired, it may be firmly held in position by expanding and extruding the upper portion of the shell 13 until it is snugly fitted within the neck 12. Other means of holding the shell in place are by force fitting or the use of suitable adhesives.

To insure that the dispenser 11 remains in place within the container 10 a spring prong 16 is provided in the upper portion of the shell 13. This prong 16 is permanently deformed to extend outwardly from the wall 18 of the shell 13. After the dispenser 11 has been fully inserted into the container 10, the prong 16, which had been forced back into the cutout portion of the wall 18 while passing through the neck opening 15, springs outwardly and engages the inclined upper wall 20 of the body 14.

Seated within the shell 13 is a float 22. This float 22 extends substantially across the dispenser 11 and it is advantageously made of a buoyant material such as cork, plastic foam, etc., or it may be a hollow body. Because of the greater diameter of the float 22, the float is maintained in the same orientation with the shell axis.

Placed on top of the float 22 is a non-buoyant ball 24. The diameter of the ball 24 is substantially less than the diameter of the shell 13 and this reduced diameter permits free passage of the ball 24 through the dispenser 11. The continuous orientation of the float 22 insures a stable platform for the ball 24 at all times.

A series of perforations 26 are provided in the shell 13 and these serve to permit liquid "L" to flow into the shell.

A valve seat 28 is provided in the upper portion of the shell 13 and when the container 10 is inverted the ball 24 becomes seated in it.

The ball 24 normally rests on the float 22 when the container 10 is in the upright position and as the level of the liquid "L" in the container 10 decreases the distance of the ball 24 from the valve seat 28 increases. Thus, when the container 10 is inverted the ball 24 and the liquid "L" both have the same distance to travel in order to reach the mouth of the container 10. As a result of the ball 24 and liquid "L" having the same travel distance on each pour, a substantially constant amount of liquid will be discharged through the opening 15 with each inversion of the container 10.

The amount of liquid which flows out of the container before the ball 24 becomes seated in the valve seat 28 is determined primarily by the size of the opening at valve seat 28 and also to some degree by the number of perforations 26 in upper region of the shell 13. Thus, a large opening and a large number of perforations in that region will give a greater dosage.

The upward travel of the float 22 is advantageously limited so that ball valve 24 will not be forced up next to valve seat 28 when the container is full of liquid "L". The limited upward movement of the float 22 is obtained by prong 30 which extends inwardly into the shell 13 a sufficient distance to retain the float 22, but not sufficiently to obstruct or interfere with the fall of the ball 24. Similarly, prong 32 may be provided in the lower region of shell 13 to limit the downward travel of float 22 when a restricted movement of the float is desired for greater flow control.

Figure 2:
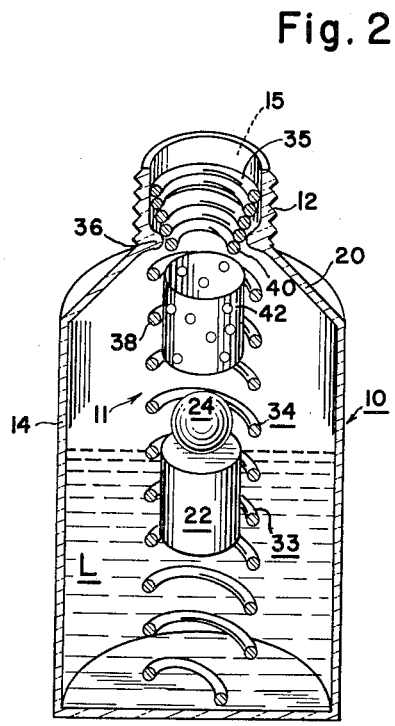
FIGURE 2 is a view similar to FIGURE 1 of a second embodiment of the dispenser.

In FIGURE 2 another embodiment of the present invention is shown wherein the shell 13 is replaced with a coil spring 34 which may be made of stainless steel or other corrosion resistant material. The loosely wound lower portion 33 of the spring 34 acts as a guide for the float 22 and the ball 24 which are set within it. The upper portion 35 of the spring 34 is tightly wound and this portion is fitted within the neck of the container 10.

A shoulder 36 is provided at the lower end of the neck opening 15. The loosely wound coils 38 of the lower portion 33 of the spring 34 may optionally have a greater cross-sectional diameter than the opening within the shoulder 36, so that once in place the coils will not fall out of the container 10 when it is inverted. Ordinarily, however, it will be more feasible to have coils 38 of smaller cross-sectional diameter than the opening within the shoulder 36, in which case a friction fit, spring tension, adhesive or other means can be used to hold dispenser permanently in container. In this embodiment the lower coil 40 of the upper spring portion 35 acts as a valve seat for the ball 24.

If desired, a short perforated shell or other stopping device 42 may be fitted within the upper region of the lower coils 38 of the spring to restrict the upward movement of float 22. This perforated shell has a passageway large enough to allow free passage of ball valve 24 but not large enough to accommodate float 22, thereby blocking the upward travel of the float at any desired point.

The function and operation of the float 22 and the ball 24 in this embodiment is the same as previously described with reference to the first embodiment.

Figure 3:
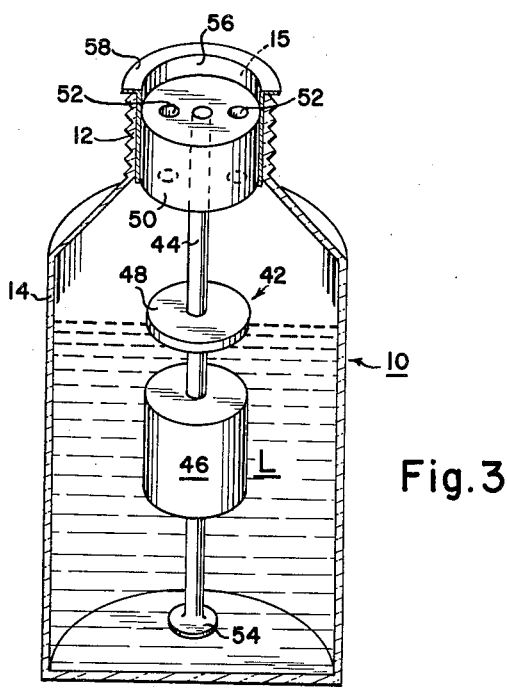
FIGURE 3 is another view similar to FIGURE 1 with another embodiment of the dispenser.

In the embodiment shown in FIGURE 3, a dispenser 42 is provided which generally comprises a guide rod 44, a float 46, a valve disc 48 and a stopper 50. The guide rod 44 extends substantially the length of the container 14. The float 46 has an opening in it and the rod 44 is inserted through this opening. The valve disc 48 also has an opening in it and the rod 44 is inserted therethrough so that the disc rests on the float 46. Fitted on the upper end of the guide rod 44 and within the neck portion 12 of the container 10 is the stopper 50.

The stopper 50 is provided with off-center openings 52 through which liquid "L" may be poured.

To prevent the float from slipping off the guide rod 44 while the dispenser is being inserted into the container 10, a stop 54 is provided at the lower end of the guide rod.

A sleeve 56 which may be an integral part of the container 10 is provided. This sleeve 56 has a flange 58 which serves as a drip spout and facilitates pouring.

In operation, when the container 10 is inverted, the valve disc 48 falls along the rod 44 from its resting place on top of the float 46. As it falls liquid "L" also moved towards the stopper 50. After a dose of liquid "L" has been poured out the openings 52, the valve disc 48 becomes seated against the stopper 50 shutting off the flow of liquid.

Since the travel of the liquid and the valve disc 48 is the same a substantially constant dosage will be obtained each time the container is inverted.

If desired the rod 44 may be bent in a "zig-zag" manner so as to slow the travel of the disc 48. Also this "zig-zag" may be limited to the upper portion of the rod and the opening in the float 46 kept to a minimum so that the float does not travel the full length of the rod. By this arrangement disc 48 will not be forced up next to stopper 50 when container is full of liquid "L".

In this embodiment it is contemplated that there will be certain usages where it will be advantageous to substitute a hollow tube open at both ends and projecting through stopper 50 in place of the solid rod 44 heretofore described. In so doing, the member will serve as an air inlet vent as well as a guide for float 46 and disc 48.

From the foregoing it will be seen that the objects set forth hereinbefore and other advantages are obtained by the present invention as shown in the various embodiments.

I claim:

1. A measured dose dispenser for use in a top opening container for holding viscous liquid as described herein, said dispenser inserted into the top opening of the container and comprising a buoyant float, a non-buoyant valve member set on top of the float, a valve seat positioned above the valve member in the dispenser and adjacent to the top opening of the container, and a guide member in cooperative relation with said float and said valve member extending downwardly from the valve seat a substantial distance into said container for guiding the direction of movement of the float and valve member whereby said float maintains the valve member in the upper region of the liquid in the container and the travel of the liquid and the travel of the valve member to the valve seat when the container is inverted are substantially equal so that a measured dose of liquid passes the valve seat on ecah inversion before said valve member becomes seated therein.

2. A dispenser as defined in claim 1 wherein said guide member is a cylindrical casing having at least one perforation therein.

3. A dispenser as defined in claim 2 wherein said perforation is near the top opening of the container.

4. A dispenser as defined in claim 1 wherein said guide member is a spirally wound corrosion resistant spring-like member said spring-like member being tightly wound in its upper portion and loosely wound in its lower portion relative to the top opening of the container, said float and valve member being contained therein.

5. A dispenser as defined in claim 4 wherein said valve seat is an integral part of the upper tightly wound portion of the guide member.

6. A dispenser as defined in claim 1 wherein said guide member is a rod and the valve seat is a stopper fitted within the top opening of the container, said rod connected to said stopper and extending into said container a substantial distance, said float and valve members having openings therethrough and the guide rod inserted therein, said valve seat stopper having openings for pouring liquid.

7. A dispenser as defined in claim 6 and further including a float stop on the lower end of the guide rod.

8. A measured dose dispenser for use in a top opening container for holding liquids, said dispenser comprising a shell casing having perforations therein, a float within said casing and of reduced cross section relative to the casing for free passage therethrough, a ball valve member within said casing and set on said float, a valve seat securely fitted against the interior of the casing and above said ball valve, said casing being fixedly secured to the container and communicating with the top opening, and said casing extending downwardly into said container, retainer means on the outer surface of said casing and engaging said container, limit means spaced within said casing for restricting the movement of the float but permitting free passage of the ball valve, said float maintaining the ball valve in the upper region of the liquid in the container whereby the travel of the liquid and the travel of the ball valve to the valve seat is substantially equal at all liquid levels, a measured amount of said liquid preceding the ball valve when the container is inverted so that a measured amount of liquid passes the valve seat on each inversion of the container prior to the ball valve being engaged in the valve seat.

9. A measured dose dispenser for use in a top opening container for holding liquids, said dispenser comprising a wound coil spring-like guide member, said member being tightly wound in its upper portion and integrally connected to the top opening and said lower portion being loosely wound and extending into the container, a float within said loosely wound portion and of reduced cross section relative to said portion for free passage therethrough, a ball valve member within said guide member and set on said float, a valve seat integral with the tightly wound portion of the guide member, said float maintaining the ball valve in the upper region of the liquid in the container whereby the travel of the liquid and the travel of the ball valve to the valve seat is substantially equal at all liquid levels, a measured amount of said liquid preceding the ball valve when the container is inverted so that a measured amount of liquid passes the valve seat on each inversion of the container prior to the ball valve being engaged in the valve seat.

References Cited in the file of this patent

UNITED STATES PATENTS

| | | |
|---|---|---|
| 1,067,565 | Webb | July 15, 1913 |
| 1,883,139 | Walter | Oct. 18, 1932 |
| 2,141,871 | Koukal | Dec. 27, 1938 |
| 2,519,479 | Koukal | Aug. 22, 1950 |